US008755553B2

(12) United States Patent
Slotte

(10) Patent No.: US 8,755,553 B2
(45) Date of Patent: Jun. 17, 2014

(54) APPARATUS

(75) Inventor: Thomas Benedict Slotte, Turku (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/518,732

(22) PCT Filed: Dec. 24, 2009

(86) PCT No.: PCT/EP2009/067928
§ 371 (c)(1),
(2), (4) Date: Jul. 6, 2012

(87) PCT Pub. No.: WO2011/076289
PCT Pub. Date: Jun. 30, 2011

(65) Prior Publication Data
US 2012/0269373 A1    Oct. 25, 2012

(51) Int. Cl.
*H04R 25/00* (2006.01)
(52) U.S. Cl.
USPC ............................ 381/353; 381/345; 381/351
(58) Field of Classification Search
USPC ........ 381/71.6, 328, 334, 335, 337, 345, 346, 381/349, 351, 353, 354, 371, 372, 373; 379/420.02, 430, 433.02; 181/129, 181/130, 135
See application file for complete search history.

(56) References Cited

U.S. PATENT DOCUMENTS

| 4,005,278 | A | * | 1/1977 | Gorike | 381/373 |
| 4,742,887 | A | * | 5/1988 | Yamagishi | 181/129 |
| 6,104,808 | A | | 8/2000 | Alameh et al. | |
| 6,144,738 | A | | 11/2000 | Hawker et al. | |
| 6,259,796 | B1 | * | 7/2001 | Lin | 381/371 |
| 6,658,110 | B1 | * | 12/2003 | Andersen | 379/433.02 |
| 6,785,395 | B1 | * | 8/2004 | Arneson et al. | 381/334 |
| 7,058,366 | B2 | | 6/2006 | Patterson | |
| 7,092,745 | B1 | | 8/2006 | D'Souza | |
| 2009/0233651 | A1 | | 9/2009 | Weckstrom et al. | |

FOREIGN PATENT DOCUMENTS

EP    1127475 B1    1/2003
WO    02/34006 A2    4/2002

OTHER PUBLICATIONS

International Search Report and Written Opinion received for corresponding International Patent Application No. PCT/EP2009/067928, dated Oct. 11, 2010, 15 pages.

* cited by examiner

*Primary Examiner* — Huyen D Le
(74) *Attorney, Agent, or Firm* — Harrington & Smith

(57) ABSTRACT

An apparatus comprises: a transducer configured to generate sound; and a housing defining a first cavity and a second cavity, the first cavity and the second cavity being connected to the transducer; wherein the first cavity comprises a first sound outlet at a first surface of the housing; and the second cavity comprises a second sound outlet at the first surface of the housing and a third sound outlet at a second surface of the housing wherein the first and second cavities and the first and second sound outlets are configured to limit a sound pressure level of the generated sound at the first and second outlets at one or more frequencies.

19 Claims, 6 Drawing Sheets

APPARATUS

RELATED APPLICATION

This application was originally filed as PCT Application No. PCT/EP2009/067928 filed Dec. 24, 2009.

The present application relates to a method and apparatus. In some embodiments the method and apparatus relate to an electronic device comprising a transducer and in particular a transducer configured for a combined earpiece and loudspeaker construction.

Some electronic devices comprise integrated speakers for creating sound such as playing back music or having a telephone conversation. In some electronic devices a single loudspeaker component may be used for generating sound for an earpiece function and an integrated hands free function.

An earpiece is held close to an ear for listening to the sound generated by the single loudspeaker. In contrast an integrated hands free function may be held remote from a user's ear and sounds generated from the single loudspeaker are audible at a distance.

A known arrangement for an electronic device having a single loudspeaker component for use as both an earpiece function and an integrated hands free function is to have a single sound outlet for outputting sounds for both the earpiece function and the integrated hands free function. A problem with using a single sound outlet is that if the integrated hands free mode in enabled while the electronic device is placed adjacent to a user's ear or if there is a fault with the electronic device, the user can experience an acoustic shock. That is, a user may suffer hearing damage or at least experience an uncomfortable or painful sensation because a single loudspeaker component operating in an integrated hands free mode may generate too high sound pressure when placed next to a user's ear.

A known alternative electronic device has an arrangement for directing sound from a single loudspeaker which branches out into two directions terminating in two sound outlets. The sound outlets may be on different sides of the loudspeaker. There may be a narrow outlet for the earpiece of the electronic device and a wide outlet for the integrated hands free function of the electronic device. The difference in size of the earpiece outlet and the integrated hands free outlet directs most of the sound generated by a single loudspeaker towards the integrated hands free outlet and away from the user's ear. In this way, the sound pressure in the user's ear may be reduced and acoustic shock can be avoided. However, since most of the sound is emitted by the integrated hands free outlet, a user may suffer from loss of speech privacy. When the single loudspeaker component is used for an earpiece of an electronic device and an integrated hands free function of an electronic device at the same time some sound may be transmitted into the immediate surroundings of the user, which may be overheard. This means that downlink speech may be broadcast into the immediate surroundings of a user and an entire conversation may be overheard.

A user may attempt to address a loss of speech privacy in the earpiece by blocking the integrated hands free sound outlet but this can lead to an increased risk of acoustic shock. It may also drastically reduce the sound quality of the earpiece.

Acoustic shocks may be addressed using dampening elements but speech privacy cannot be addressed without significantly reducing the sound quality of the earpiece of the electronic device.

Embodiments of the present invention aim to address one or more of the above problems.

In a first aspect of the invention there is an apparatus comprising: a transducer configured to generate sound; and a housing defining a first cavity and a second cavity, the first cavity and the second cavity being connected to the transducer; wherein the first cavity comprises a first sound outlet at a first surface of the housing; and the second cavity comprises a second sound outlet at the first surface of the housing and a third sound outlet at a second surface of the housing wherein the first and second cavities and the first and second sound outlets are configured to limit a sound pressure level of the generated sound at the first and second outlets at one or more frequencies.

Preferably the first and second cavities and the first and second outlets are configured to limit the sound pressure level a predetermined optimized frequency response.

Preferably the outlets are one or more openings in the surface of the housing.

Preferably the apparatus comprises at least one acoustic damper for damping sound from the first and second sound outlets wherein the at least one acoustic damper is also configured to limit the sound pressure level at one or more frequencies.

Preferably the at least one acoustic damper comprises an acoustic damper at each of the first and second outlets.

Preferably the acoustic damper at each of the first and second outlets have different compositions such that each damper is configured to limit the sound pressure level at different frequencies.

Preferably the different compositions at one or more of the following: thickness, density, acoustic resistance and material.

Preferably the preceding claims wherein the third outlet comprises an acoustic damper.

Preferably the acoustic damper is an acoustic damping mesh.

Preferably one or more of the outlets comprises a dust mesh for keeping dust out of the cavities.

Preferably the dust mesh is the acoustic damper.

Preferably one or more of the outlets is also configured to limit the sound pressure level at one or more frequencies.

Preferably the at one or more frequencies is one or more frequency bands.

Preferably the sound pressure level is below a threshold pressure level which causes acoustic shock in a user's ear.

Preferably the sound pressure level is any of the following: 125 dB, 120 dB, 115 dB, 110 dB, 105 dB, 100 dB, 95 dB, 90 dB, 85 db, 80 dB, 75 dB, 70 dB or 65 dB.

Preferably the first cavity is connected to one side of the transducer and the second cavity is connected to another side of transducer.

Preferably the transducer is any of the following: a dynamic or moving coil, a piezoelectric transducer, an electrostatic transducer or a transducer array comprising microelectromechanical systems.

Preferably the third sound outlet is larger than the first or second sound outlets.

Preferably the first and second surfaces are on opposite sides of the apparatus.

Preferably the housing defines at least one further cavity adjacent to the second cavity and the at least one further cavity comprises an opening on the first surface of the housing.

Preferably the second cavity and the at least one further cavity are connected by another sound outlet.

Preferably the apparatus comprises a another acoustic damper for damping sound from the another sound outlet.

Preferably the first surface of the housing is on an earpiece side configured to be adjacent to an ear when sound is produced and the second surface of the housing is on a loudspeaker side configured to be remote from an ear when sound is produced.

Preferably the volume of the first cavity is larger than the volume of the second cavity.

Preferably the third sound outlet is blockable.

Preferably the apparatus comprising a cover for blocking the third sound outlet.

Preferably the cover is any one from the following; a shutter, a slide or a mechanical switch.

Preferably the third sound outlet is configured to be blocked a digit.

Preferably the transducer forms a wall of the of the first cavity and a wall of the second cavity.

In a second aspect of the invention there is a user terminal comprising an apparatus according any of the preceding claims.

In a third aspect of the invention there is a method for producing sound in an apparatus comprising: controlling a transducer to produce sound in a first cavity such that sound is directed out of a first sound outlet on a first surface of the apparatus; and controlling a transducer to produce sound in a second cavity such that sound is directed of out a second sound outlet on the first surface of the apparatus and sound is directed out of a third sound outlet on a second surface of the apparatus wherein the first and second cavities and the first and second sound outlets are configured to limit a sound pressure level of the generated sound at the first and second outlets at one or more frequencies.

In a fourth aspect of the invention there is a computer program comprising code adapted to perform the method discussed above when the program is run on a processor.

For a better understanding of the present application and as to how the same may be carried into effect, reference will now be made by way of example to the accompanying drawings in which.

The following describes apparatus and methods for combined earpiece and loudspeaker construction.

Figure 1:
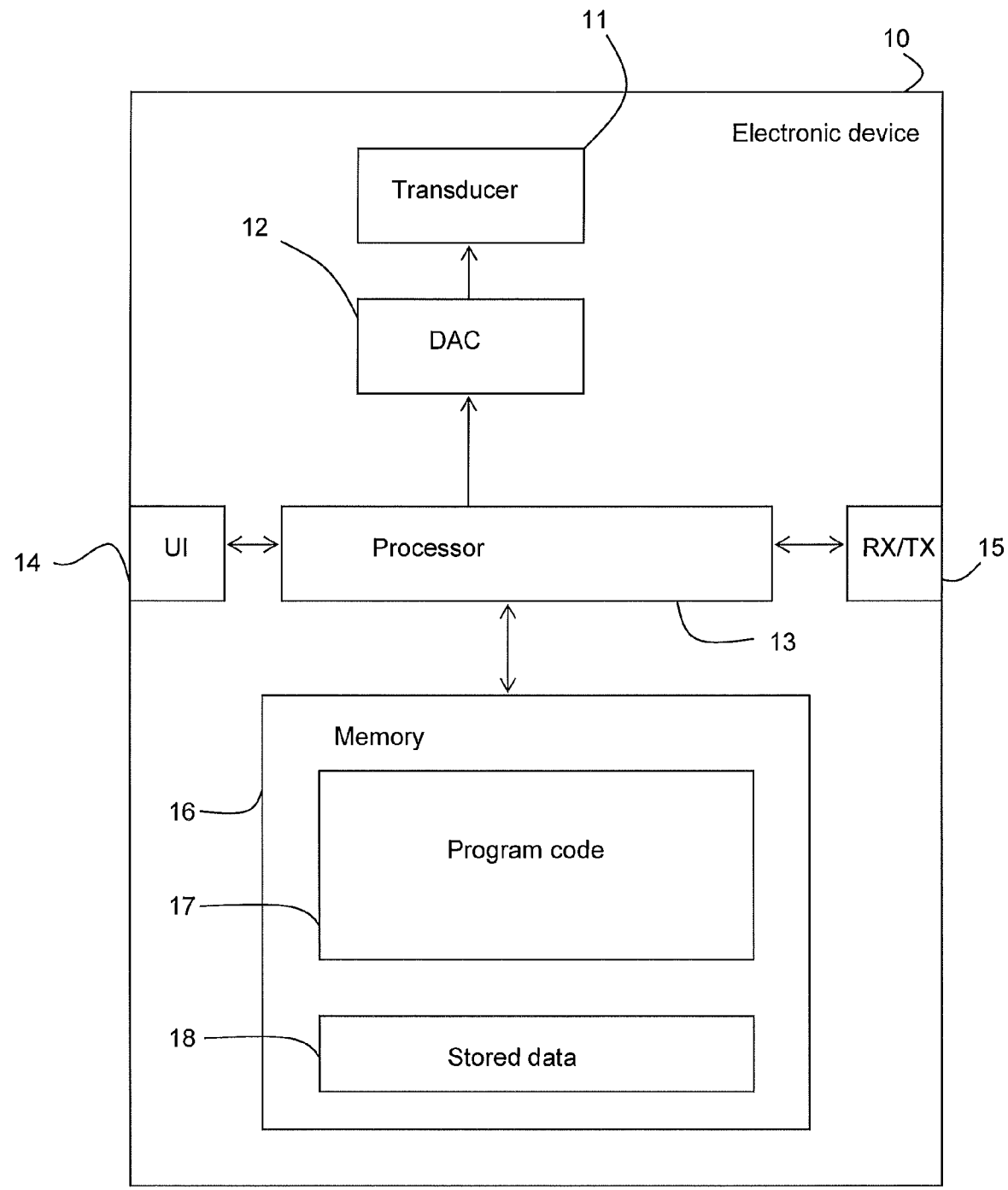
FIG. 1 illustrates a schematic block diagram of apparatus according to some embodiments.

In this regard reference is first made to FIG. 1 which shows a schematic side view of an exemplary electronic device 10 or apparatus according to some embodiments. The apparatus 10 incorporates a combined earpiece and loudspeaker construction.

The apparatus 10 comprises a transducer 11 which may be an integrated speaker such as an integrated hands free speaker (IHF). The integrated hands free speaker in some embodiments may be a dynamic or moving coil, a piezoelectric transducer, an electrostatic transducer or a transducer array comprising microelectromechanical systems (MEMS). Additionally or alternatively the transducer 11 comprises a multifunction device (MFD) component having any of the following; combined earpiece, integrated hands free speaker, vibration generation means or a combination thereof.

The apparatus 10 is in some embodiments a mobile terminal, mobile phone or user equipment for operation in a wireless communication system. In other embodiments, the electronic device is any suitable electronic device configured to generate sound, such as for example a digital camera, a portable audio player (mp3 player), a portable video player (mp4 player). In other embodiments the apparatus 10 may be any suitable electronic device with an speaker configured to generate sound whereby a user may want to listen to sound discreetly through an earpiece or at a distance from the electronic device through an integrated hands free speaker.

In some embodiments, the apparatus 10 comprises a sound generating module which is linked to a processor 13. The processor 13 may be configured to execute various program codes. The implemented program codes may comprise a code for controlling the transducer 11 to generate sound.

The implemented program codes in some embodiments 17 may be stored for example in the memory 16 for retrieval by the processor 13 whenever needed. The memory 16 could further provide a section 18 for storing data, for example data that has been processed in accordance with the embodiments. The code may, in some embodiments, be implemented at least partially in hardware or firmware.

The processor 13 may comprise an audio subsystem which may comprise an audio output subsystem where in some embodiments the processor 13 is linked via a digital-to-analogue converter (DAC) 12 to the transducer 11. The digital to analogue converter (DAC) 11 may be any suitable converter.

In some embodiments the DAC 12 may send an electronic audio signal output to the transducer 11 and on receiving the audio signal from the DAC 12, the transducer 11 generates sound for the user's ears. In other embodiments, the apparatus 10 may receive control signals for controlling the transducer 11 from another electronic device.

The processor 13 may be further linked to a transceiver (TX/RX) 15, to a user interface (UI) 14 and to a display (not shown). The user interface 14 may enable a user to input commands or data to the electronic device 10. Any suitable input technology may be employed by the electronic device 10. It would be understood for example the apparatus in some embodiments may employ at least one of a keypad, keyboard, mouse, trackball, touch screen, joystick and wireless controller to provide inputs to the electronic device 10.

Figure 2:
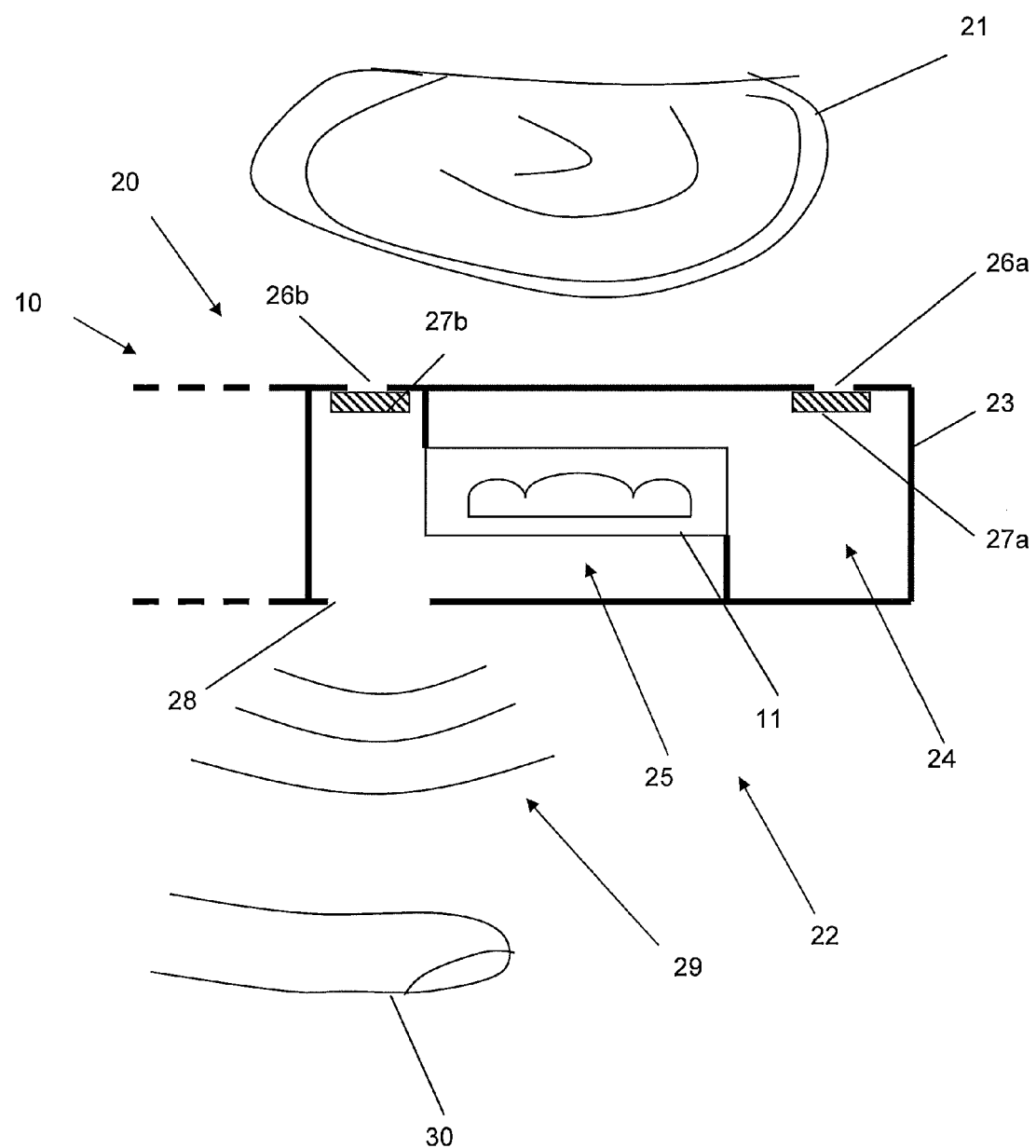
FIG. 2 illustrates a schematic side view of an apparatus according to some embodiments.

FIG. 2 discloses a schematic side view of an apparatus 10. In some embodiments the apparatus is a mobile telephone configured to provide an earpiece function and a hands free function.

The apparatus 10 provides an earpiece function whereby a user may place the earpiece side 20 of the apparatus 10 adjacent to the user's ear 21. When the user places an ear 21 next to the earpiece side 20 the user may discreetly listen to generated sound.

The apparatus 10 may provide a hands free function whereby sound is emitted from a hands free side 22 of the apparatus 10 such that a user can hear the sound produced when the apparatus 10 is remote from the user's ear 21. Typically the hands free side 22 is a different side of the apparatus to the earpiece side 20. In some embodiments, the hands free side 22 is the opposite side of the apparatus 10 to the earpiece side 20 such that when sound is directed from the earpiece side towards an ear 21, sound directed from the hands free side is directed away from the ear 21.

The apparatus 10 comprises a transducer 11 which is configured to generate sound when signals are received from the processor 13 via a digital-to-analogue converter 12.

The transducer 11 is mounted in a housing 23 of the apparatus 10 such that the transducer 11 is acoustically connected to an earpiece cavity 24 and a hands free cavity 25. In some embodiments the walls of the housing 23 define the earpiece cavity 24 and the hands free cavity 25. In this way, the cavities 24, 25 are integral with the housing 23. In other embodiments separate interior walls may be provided to define the cavities 24, 25.

In some embodiments, the earpiece cavity 24 and the hands free cavity 25 are adjacent to the transducer 11. The transducer 11 may define part of the wall of one or more of the cavities 24, 25. In other embodiments one or more of the cavities 24, 25 may be remote from the transducer 11. In some embodiments there may be an acoustic damping means or acoustic damper between the earpiece cavity 24 and the transducer 11. The transducer 11 may be orientated such that the front of the transducer 11 faces the earpiece side 20 or alternatively the front of the transducer 11 may face the hands free side 22. Indeed some other embodiments the front of the transducer 11 may not face the earpiece side 20 or the hands free side 22.

In some embodiments, the earpiece side 20 of the apparatus 10 comprises earpiece outlets 26a and 26b. Earpiece outlet 26a is a hole in the surface of the housing 23 connecting the earpiece cavity 24 to the exterior of the apparatus 10. Earpiece outlet 26b is a hole in the housing 23 connecting the hands free cavity 25 with the exterior of the apparatus 10. The earpiece outlets 26a, 26b are covered with acoustic damping means or acoustic dampers 27a, 27b. The acoustic dampers 27a, 27b may be in some embodiments a mesh or textile of suitable kind having a high acoustic resistance. In some embodiments, there may be a damping mesh having a specific acoustic resistance of 100 to 600 Pas/m. In other words the acoustic dampers attenuates the loudness of the sound as the sound passes through the acoustic dampers.

In some embodiments the earpiece cavity 24 and earpiece outlets 26a, 26b and the hands free cavity 25 and the hands free outlets 28 are configured to be resonators. That is, the resonators are configured to resonate over a limited frequency range and amplify the sound over the limited frequency range when the transducer 11 generates sound.

The resonators are configured to generate a resonance peak which may be defined by a Q factor. The characteristics of this peak such as the sharpness, height and bandwidth is dependent on the configuration of, for example, the earpiece cavity 24 and earpiece outlets 26a 26b combination. The configuration may be dependent on the size and shape of the cavity and the outlets and the relative positioning of the outlets with respect to the cavity. Furthermore, the Q factor may also be dependent on acoustic dampers in the cavity 24 and the outlets 26a 26b.

In some embodiments, the Q factor of a resonator may be low without adding any acoustic dampers. In other embodiments, the Q factor may be too high and acoustic dampers are used to adjust the Q factor.

In this way, the earpiece cavity 24 and the earpiece outlets 26a 26b may be configured to amplify the sound to a predetermined sound pressure value. In some other embodiments the earpiece cavity 24 and the earpiece outlets 26a, 26b are configured to provide a small amount of amplification.

Alternatively, in other embodiments the earpiece cavity 24 and earpiece outlets 26a, 26b are not configured to be a resonator because the earpiece cavity may comprise damping material which attenuates the resonance such that no amplification of the sound at any frequency is produced. In further embodiments the hands free outlet 28 comprises damping material (not shown) which attenuates the resonance such that no amplification of the sound is produced.

In some embodiments the earpiece outlets 26a, 26b and the hands free outlet 28 may comprise a dust mesh for preventing dust entering the cavities 24, 25. A dust mesh is configured to protect the apparatus 10 against other environmental conditions and prevent water and other particles entering the cavities and reaching the transducers. In some embodiments the dust mesh also acts as an acoustic damper.

In some embodiments there are a plurality of earpiece outlets for permitting the transmission of sound from the cavities 24, 25 to the exterior of the apparatus 10. In some embodiments the earpiece outlets 26a 26b may allow a user to adjust or find an optimum handset position more easily. A user may try to find an optimum listening position especially in noisy places using at least two earpiece outlets. In some embodiments there may be more than two earpiece outlets. In some embodiments each outlet may comprise a plurality of openings. For example there may be two or more earpiece outlets connected the earpiece cavity 24 and/or there may be two or more earpiece outlets connected to the hands free cavity 25.

The hands free side 22 of the apparatus 10 comprises a hands free outlet 28 which is a hole in the surface of the housing connecting the hands free cavity 25 to the exterior of the apparatus 10. The hands free outlet 28 is located on a different side of the apparatus 10 to the earpiece outlets 26a, 26b. The hands free outlet 28 is configured to permit sound to be outputted from the hands free cavity 25 in a different direction from the sound outputted from the earpiece outlets 26a, 26b.

In some embodiments each of the earpiece and the hands free outlets 26a, 26b, 28 may be a single opening. Alternatively, each of the earpiece and the hands free outlets 26a, 26b, 28 may be a plurality of openings.

In some embodiments the volume of the earpiece cavity 24 is greater than the volume of the hands free cavity 25. In some embodiments the earpiece cavity 24 is greater than the volume of the hands free cavity 25 so that the a user does not experience a reduction in earpiece performance. In other embodiments the volume of the earpiece cavity is the same or less than the volume of the hands free cavity. The hands free cavity 25 and hands free outlet 28 is configured to amplify sound generated by the transducer 11 more than the earpiece cavity 24 and earpiece outlets 26a, 26b. In some embodiments, the earpiece cavity 24 is configured to not amplify the sound generated by the transducer to prevent acoustic shock to a user.

In some embodiments the earpiece cavity 24 comprises a volume about 1 $cm^3$. In some embodiments the hands free cavity 25 has a volume of about 0.4 $cm^3$.

In some embodiments the apparatus may be acoustically tuned to a particular frequency response. In this way, apparatus may have different acoustic properties at different frequencies. For example the apparatus may dampen or amplify sound differently at different frequencies. In this way the maximum sound pressure level can be predetermined at one or more particular frequencies such that acoustic shock is not experienced by a user at a particular frequency in use.

In some embodiments the apparatus may be tuned to avoid acoustic shock at one or more frequencies. The one or more frequencies may be one or more frequency bands at which the apparatus demonstrates different acoustic characteristics from other frequencies. In particular the apparatus may be tuned to a predetermined optimized frequency response. In some embodiments the earpiece function and/or the hands free function are acoustically tuned to one or more frequency responses. In particular, the earpiece function may be acoustically tuned to a first frequency response and the hands free function may be acoustically tuned to a second frequency response. In some embodiments the earpiece function is acoustically tuned to avoid acoustic shock at a voice at a listening position during a handset speech call. Since the earpiece is mostly used for holding conversations, acoustic shock may be reduced during the majority of use by tuning the frequency response to a speech bandwidth. The speech bandwidth may be a narrow band for a narrow band speech call or wideband for a wideband speech call. The apparatus 10 may be configured for a wideband speech call and/or a narrow band speech call.

In some embodiments the apparatus 10 is acoustically tuned by varying the size and shape of the cavities 24, 25. Additionally acoustic damping material such as a damping mesh may be placed in the cavities 24, 25 for attenuating the sound. The position and amount of the damping material may be varied to acoustically tune the frequency response apparatus.

The acoustic dampers 27a 27b at each of the earpiece outlets 26a and 26b may be different. In some embodiments the acoustic resistance of the acoustic dampers is different and therefore each earpiece outlet 26a, 26b may have a different frequency response. In other words each outlet 26a, 26b may preferentially dampen sound at different frequencies. This means the apparatus 10 may be tuned in a more flexible manner.

In some other embodiments the frequency response of the apparatus may be further acoustically tuned by the varying the size, number and position of the earpiece and hands free outlets 26a, 26b and 28. For example an outlet with a small cross sectional area produces a different frequency response to an outlet with a large cross sectional area.

In some embodiments the size of the earpiece outlets 26a, 26b is smaller than the hands free outlets 28. This means that the sound is dampened less when outputted from the hands free cavity 25 compared to sound outputted from the earpiece cavity 24. In some embodiments the earpiece outlets 26a, 26b have a cross sectional area of about 1 millimeter$^2$. In some embodiments the hands free outlet 28 has a cross sectional area of about 5-10 millimeters$^2$.

In some embodiments, the amplification and frequency response of the apparatus is tuned by modifying the relative sizes of the cavities 24, 25, the relative sizes of the outlets 26a, 26b, 28 and the composition and placement of the acoustic dampers 27a 27b. By modifying the parameters of the apparatus such as shape, size and composition, the frequency response can be modified to adjust the performance of the earpiece function and the hands free function of the apparatus 10.

In use, the transducer receives control signals for generating sound. In response to received control signals, the transducer 11 generates sound which is transmitted to the earpiece cavity 24 and the hands free cavity 25. The hands free cavity 25 and hands free outlet 28 then amplifies the sound produced by the transducer 11. In some other embodiments the hands free cavity 25 and hands free outlet 28 comprise damping and no amplification of the sound is produced. Alternatively in some embodiments the hands free cavity 25 and hands free outlet 28 are configured to limit amplification to a predetermined sound pressure value. In this way the hands free cavity 25 and the hands free outlet 28 may be configured to provide a small amount of amplification.

In some embodiments the hands free cavity 25 and the hands free outlet 28 are tuned to provide a frequency response to a speech bandwidth. The speech bandwidth may be a narrow band for a narrow band speech call or wideband for a wideband speech call. The apparatus 10 may be configured for a wideband speech call and/or a narrow band speech call.

Sound exits the housing 23 from the earpiece cavity 24 and the hands free cavity 25 via earpiece outlets 26 and 26b to the exterior of the apparatus 10 on the earpiece side 20 of the apparatus 10.

As the sound is outputted from the cavities 24, 25 to the exterior of the housing 23 on the earpiece side 20 of the apparatus 10, the sound is transmitted through the acoustic dampers 27a, 27b. As the sound passes through the acoustic dampers 27a, 27b, the sound loses energy and is dampened such that the sound pressure level in an ear 21 is comfortable for a user when the ear 21 is pressed up against the earpiece side 20 of the apparatus 10. The earpiece outlet 26b is connected to the hands free cavity 25 and increases the level of the high frequencies on the earpiece side 20 of the apparatus 10. Furthermore, the earpiece outlet 26b being connected to the hands free cavity 25 causes the earpiece function to produce sound which is better balanced between low and high frequency regions. Indeed, earpiece function of the apparatus 10 generates sound which a user may perceive being less dominated by bass frequencies.

In this way, the apparatus 10 does not need additional components to emphasise bass frequencies to balance low and high frequency regions, such as a bass reflex tube. Incorporating a bass reflex tube configured to generate additional low frequency content in an electronic device may be challenging in production and tooling. Indeed electronic devices are becoming increasingly smaller in design and including additional components such as a bass reflex tube is a mechanically more challenging task.

Advantageously in some embodiments the apparatus can be easily adapted by any electronic device because the apparatus may be easily implemented in electronic devices. Furthermore in some embodiments the entire frequency response of the apparatus has less bass frequencies. This means that users may perceive a more natural listening experience because bass frequencies are not heavily emphasized.

At the same time the transducer 11 produces sound which is amplified in the hands free cavity 25 and hands free outlet 28 which is then outputted from hands free cavity 25 to the exterior of the housing 23 via the hands free outlet 28. Sound outputting from the hands free outlet 28 is represented by curved lines 29 in FIG. 2. In some embodiments the sound outputted from the hands free cavity 25 is not amplified or amplified by a small amount.

Advantageously the transducer 11 produces sound for both the earpiece function of the apparatus 10 and the hands free function of the apparatus. This means that only a single loudspeaker component is required for the combined functionality of the earpiece and the hands free functionality which reduces the overall cost of the apparatus 10.

FIG. 2 shows an arrangement whereby sound produced by the transducer 11 is emitted from the hands free outlet 28. However, in some environments the user may not want the sound to be transmitted to the immediate surroundings of the apparatus 10.

If the user does not want sound produced by the transducer 11 to be emitted from the hands free outlet 28 then the user may block the hands free outlet 28. In some embodiments the user blocks the hands free outlet 28 with their finger 30 or other suitable means for blocking the hands free outlet 28. In this way, the leakage of sound from the hands free outlet 28 is reduced and the privacy for the user is increased because less sound is transmitted from the hands free outlet 28.

When the hands free outlet 28 is blocked by a finger 30 or other digit, the sound produced by the transducer 11 is outputted from earpiece outlets 26a and 26b. Advantageously, this means that the sound pressure level in the ear from the earpiece outlets 26a and 26b does not exceed a level causing acoustic shock in the ear of a user.

In some embodiments the hands free outlet 28 may be alternatively, or additionally blocked by a blocking means or cover such as a shutter, slide or other suitable means for blocking the hands free outlet 28.

Figure 3:
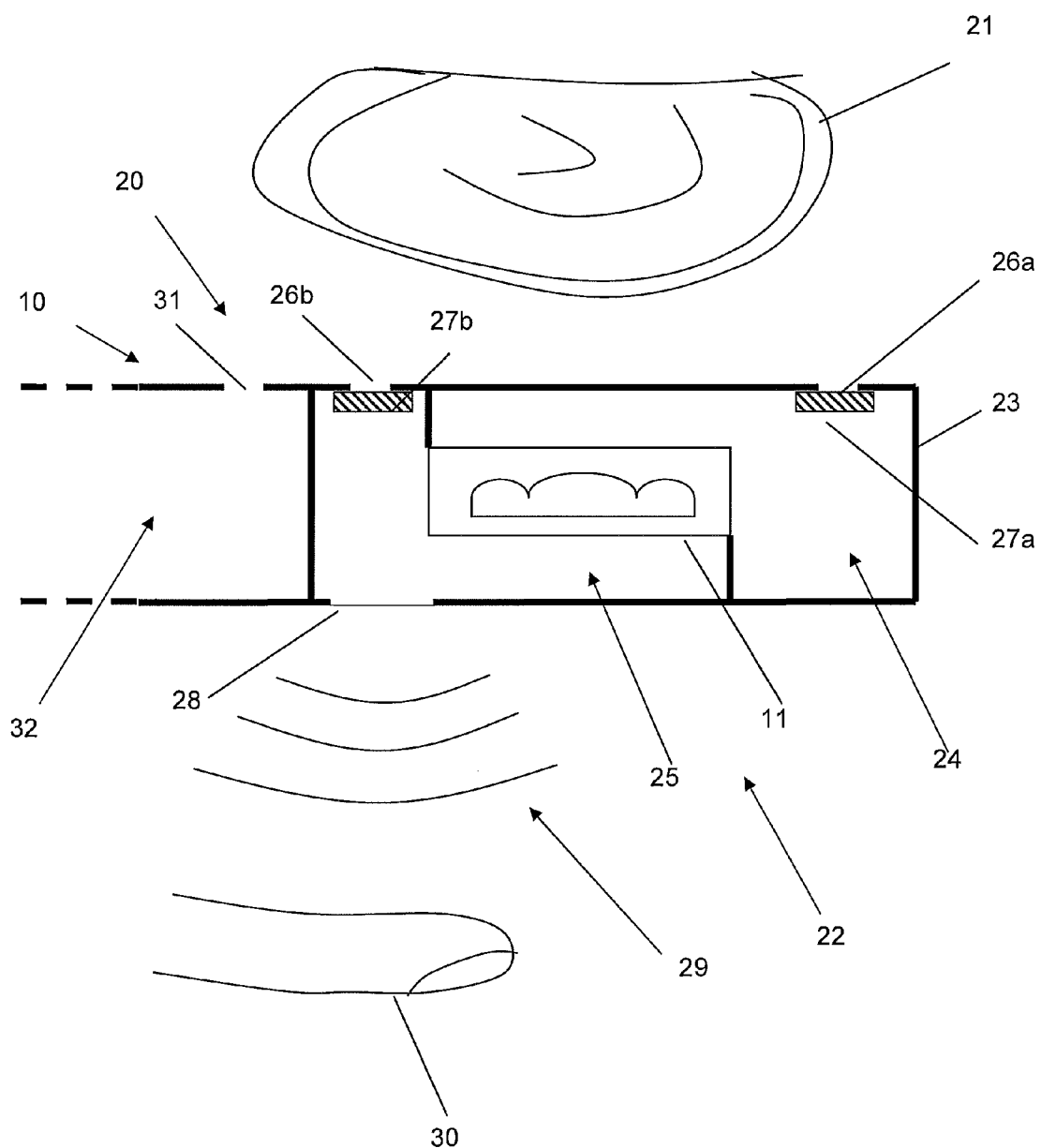
FIG. 3 illustrates a schematic side view of an apparatus according to some further embodiments.

FIG. 3 discloses a schematic side view of the apparatus 10 according to some other embodiments. FIG. 3 is the same as the embodiments described in reference to FIG. 2 except that the housing 23 comprises a leakage opening 31. The leakage opening 31 permits excess sound pressure to escape from the user's ear through leakage opening 31 into the housing cavity 32. This reduces the sound pressure in the ear and may further avoid acoustic shock. The leakage opening 31 improves the leak tolerance of the earpiece. In some embodiments the housing cavity 32 is an air space defined by the housing 23 between the earpiece side 20 and the hands free side 22 of the apparatus 10. Typically the housing cavity 32 encloses other components of the apparatus 10, for example electronics mounted on a printed circuit board. In some embodiments, the housing cavity 32 may have additional leakage openings that let sound escape further into the exterior of apparatus 10.

Figure 5:
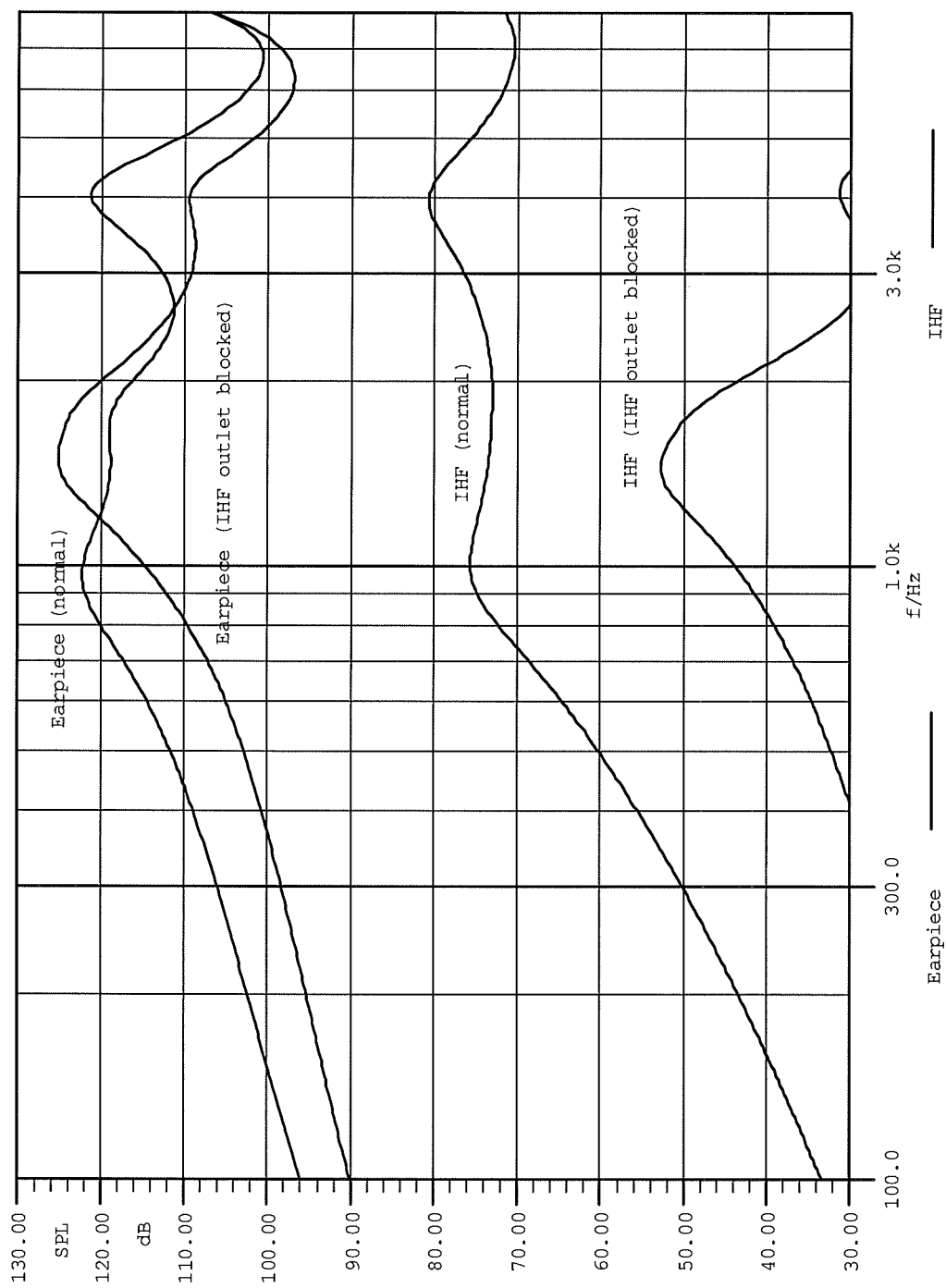
FIG. 5 illustrates a graph of frequency responses according to some embodiments.

FIG. 5 shows a graph of a simulation result of frequency versus sound pressure level (SPL) for embodiments described in reference to FIG. 3. The graph shows the sound pressure level at different frequencies for the earpiece function and the integrated hands free function of the apparatus 10 when the hands free outlet 28 is blocked and unblocked. The graph shown in FIG. 5 comprises four traces of frequency versus sound pressure level wherein each trace represents different parameters used with the apparatus 10.

The first trace is labelled "Earpiece (normal)". The first trace corresponds to the sound pressure level versus frequency at the earpiece side 20 of the apparatus 10 when the apparatus 10 is in normal use. That is, the earpiece outlets 26a, 26b and the hands free outlet 28 are all unblocked. Since an ear 21 is adjacent to the earpiece side 20 in normal use, the sound pressure level at the earpiece side 20 is substantially the same as in the ear 21.

The second trace is labelled "Earpiece (IHF outlet blocked)". The second trace corresponds to the frequency versus sound pressure level at the earpiece side 20 of the apparatus 10 when the hands free outlet 28 is blocked. That is, the earpiece outlets 26a and 26b are unblocked and the hands free outlet 28 is blocked. In some embodiments the sound pressure level at the earpiece side 20 when the hands free outlet 28 is blocked is generally about 10 dB less than when the hands free outlet 28 is unblocked. In other embodiments the sound pressure level at the earpiece side 20 when the hands free outlet 28 is unblocked compared to when the hands free outlet 28 is blocked may vary depending on the design of the apparatus 10.

The third trace is labelled "IHF (normal)". The third trace corresponds to the frequency versus sound pressure level at a distance of one meter from the hands free outlet 28 when the apparatus 10 is in normal use. Similar to the first trace, normal use corresponds to the earpiece outlets 26a and 26b and the hands free outlet 28 being unblocked. The integrated hands free function provides a maximum output of roughly 75 to 80 dB at a distance of one meter from the hands free outlet 28 of the apparatus 10.

The fourth trace is labelled "IHF (IHF outlet blocked)". The fourth trace corresponds to the frequency versus sound pressure level at a distance of one meter from the hand free outlet 28 when the hands free outlet 28 of the apparatus 10 is blocked. When the hands free outlet 28 is blocked, the sound pressure level drops by about 20 to 50 dB compared to when the hands free outlet 28 is unblocked.

A user may keep the sound pressure level in their ear such that the sound pressure is below a predetermined sound pressure value in order to avoid acoustic shock throughout the complete frequency range of the earpiece. In some embodiments the predetermined sound pressure value is 125 dB. Alternatively some users may experience acoustic shocks above a different lower sound pressure value. In some other embodiments the predetermined sound pressure value may be 120 dB, 115 dB, 110 dB, 105 dB, 100 dB, 95 dB, 90 dB, 85 db, 80 dB, 75 dB, 70 dB or 65 dB. Indeed, the apparatus 10 may be configured depending on a user's comfort levels. In this way the apparatus can be adjusted to compensate for different users having different hearing mechanisms.

In a normal listening situation, the user may adjust the sound level of the earpiece function from an example value of 125 dB to a comfortable level, for example a reduction in sound pressure level of 35 dB to 90 dB. The user may adjust the sound level in some embodiments by using a volume control button or a volume control software.

The sound pressure level of the hands free side 22 is also lowered because the transducer 11 generates sound for both the earpiece function and the hands free function at the same time. The integrated hands free output 28 is then also reduced by 35 dB to about 40 to 45 dB at a distance of one meter. A sound pressure level of 40 to 45 dB would be loud enough such that the downlink speech may be heard by a user in a quiet environment from the integrated hands free outlet 28.

However, when the hands free outlet 28 is blocked the user can attenuate the sound emitted to the immediate surroundings of the apparatus 10 from the hands free outlet by a further 20 to 50 dB. This is shown as the difference in sound pressure level between the third and fourth traces in FIG. 5.

In this way, the user can manually reduce the amount of sound transmitted to the immediate surrounding of the apparatus 10. When the user blocks the hands free outlet 28 the sound pressure level in the user's ear drops only by 10 dB or less. This drop in sound pressure level is generally shown in FIG. 5 as the difference between the first and second traces.

Figure 4:
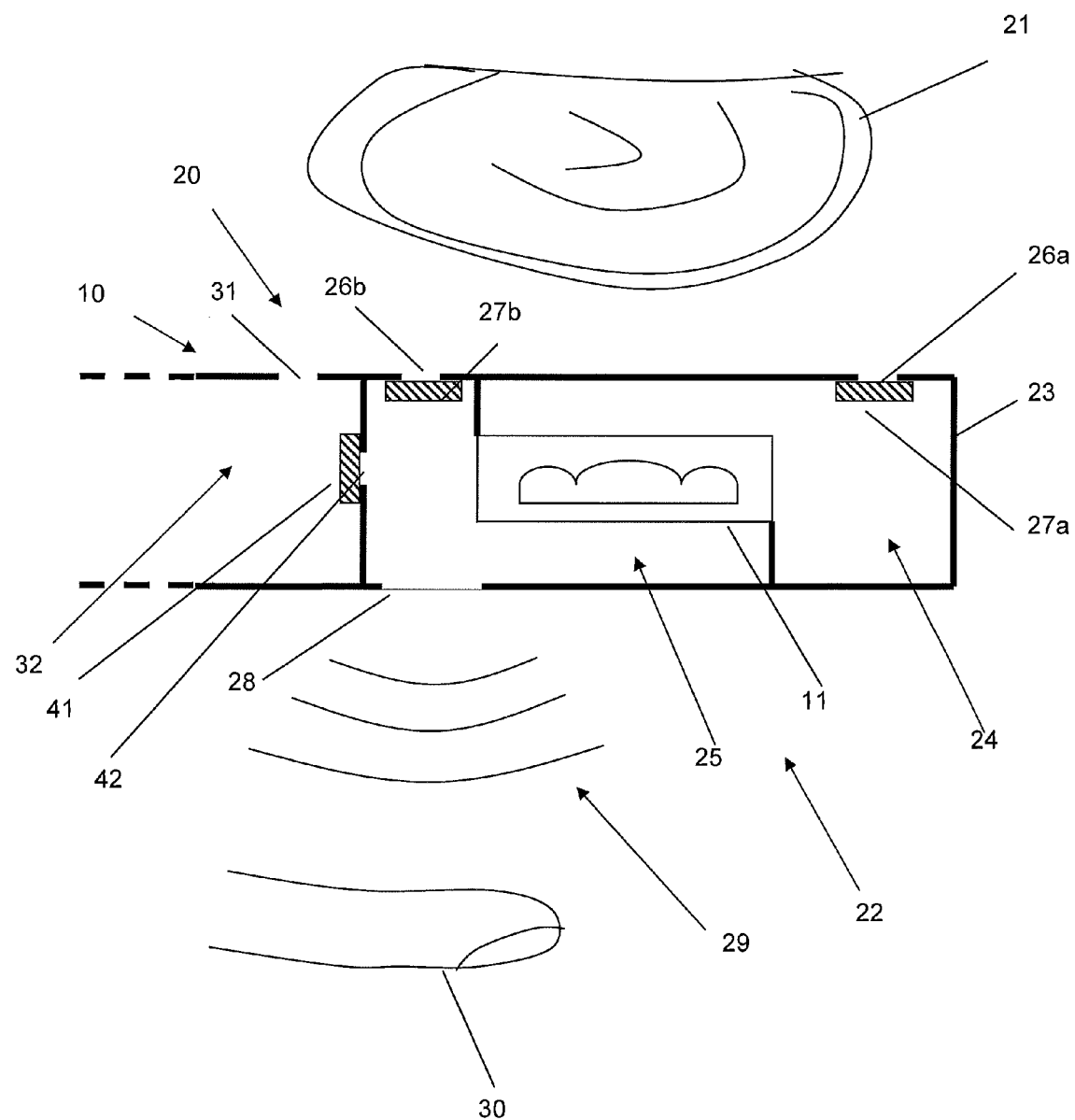
FIG. 4 illustrates a schematic side view of an apparatus according to some additional embodiments.

FIG. 4 illustrates a schematic side view of an apparatus 10 according to some further embodiments. FIG. 4 is schematically similar as the embodiments described in reference to FIG. 3 except that there is a further outlet 42, or bypass, between the hands free cavity 25 and the housing cavity 32. The outlet 42 in some embodiments is covered with an acoustic damper 41. The acoustic damper 41 is similar to the acoustic dampers 27a and 27b. In contrast the hands free outlet 28, outlet 42 cannot be blocked by a user during use because outlet 42 connects an interior wall of the housing cavity 32 and the hands free cavity 25.

The presence of outlet 42 allows for a design compromise providing balance between sound quality at the earpiece side 20 and the amount of attenuation of the sound when the hands free outlet is blocked 28. In some embodiments, the apparatus 10 is designed to provide less attenuation of sound outputted from the hands free side 22 when a user blocks the hands free outlet 28. This is because some sound will escape into the immediate surroundings of the apparatus 10 through outlet 42 and sound leaks in the housing cavity 32 device. At the same time the sound quality at the earpiece side 20 when the hands free outlet 28 is blocked will be higher than if outlet 42 were not present.

Figure 6:
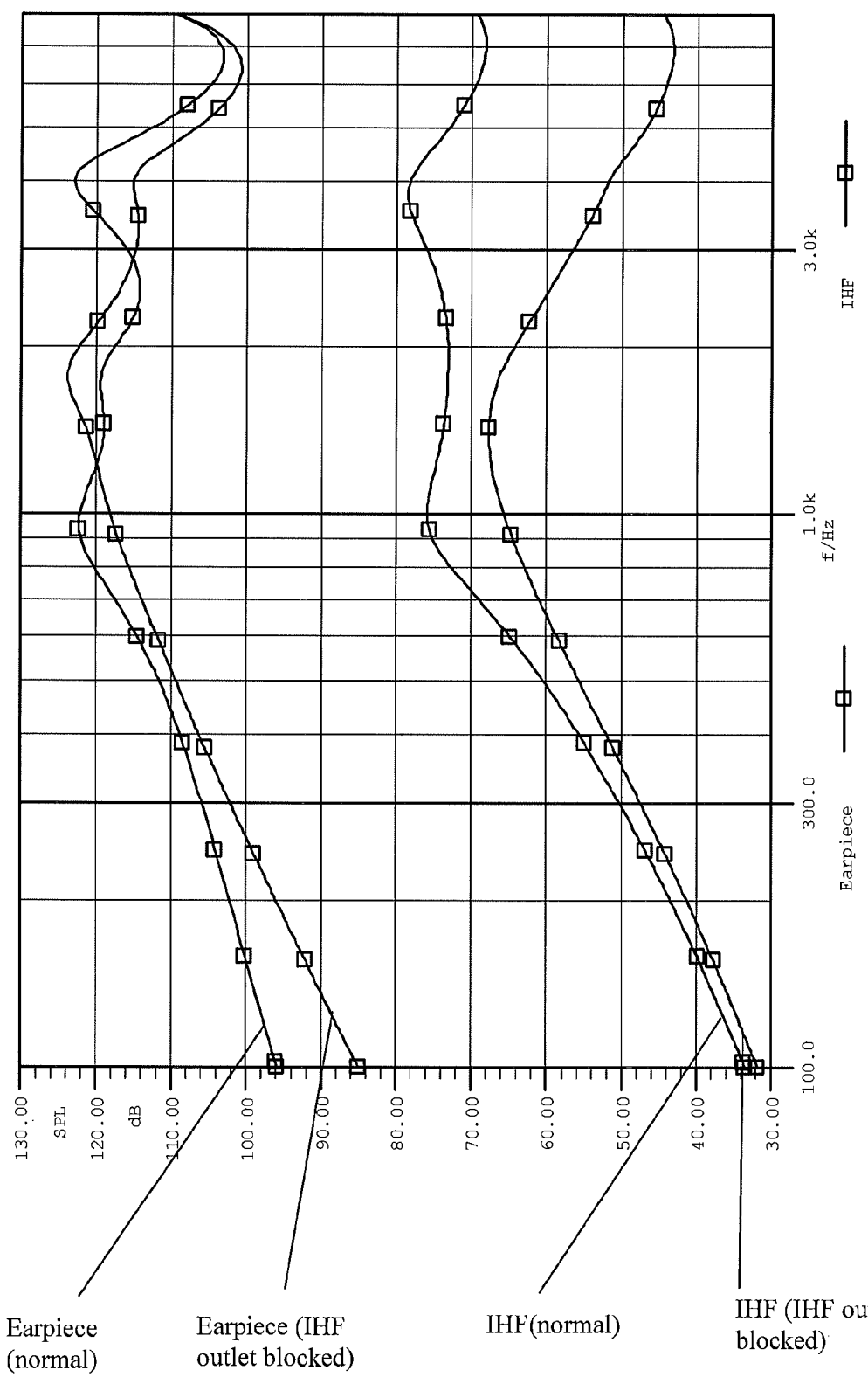
FIG. 6 illustrates a graph of frequency responses according to some embodiments.

FIG. 6 discloses a simulation result of frequency versus sound pressure level for the embodiments described in reference to FIG. 4. The graph shows the sound pressure level at different frequencies for the earpiece function and the integrated hands free function of the apparatus 10 when the hands free outlet 28 is blocked and unblocked.

Similar to FIG. 5, FIG. 6 shows a first trace labelled "Earpiece (normal)", a second trace labelled "Earpiece (IHF outlet blocked)", a third trace labelled "IHF (normal)" and a fourth trace labelled "IHF (IHF outlet blocked)". The four traces of FIG. 6 correspond to the same arrangement of the hands free outlet 28 being blocked and unblocked as discussed for the four traces in FIG. 5.

FIG. 6 shows that the difference in sound pressure level between the first and second traces is generally less than 10 dB. This means that the difference in quality of sound at the earpiece side 20 is less when the hands free outlet 28 is unblocked and blocked compared to FIG. 5.

However, the difference in sound pressure level between the third and fourth traces is also less compared to FIG. 5. This means that the more sound is leaking into the immediate surroundings of the apparatus 10 compared to FIG. 5.

In some embodiments acoustic damping elements are omitted and dampening is provided by the physical configuration of the sound outlets. The sound outlets' physical designs may for example provide acoustic dampening as a result of non-linear effects at high sound pressure levels.

In further embodiments there may be a plurality of cavities for the earpiece function and/or the hands free function. That is, the apparatus may comprise two or more cavities.

It shall be appreciated that the term portable device is user equipment. The user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

For example, in some embodiments the method of manufacturing the apparatus may be implemented with processor executing a computer program.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and
 (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
 (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed in there is a further embodiment comprising a combination of one or more of any of the other embodiments previously discussed.

The invention claimed is:

1. An apparatus comprising:
   a transducer configured to generate sound; and
   a housing defining a first cavity and a second cavity, the first cavity and the second cavity being connected to the transducer;
   wherein the first cavity comprises a first sound outlet at a first surface of the housing;
   wherein the second cavity comprises a second sound outlet at the first surface of the housing and a third sound outlet at a second surface of the housing wherein at least one of the first and second cavities and/or at least one of the first and second sound outlets are configured to limit a sound pressure level of the generated sound at one or more frequencies and the third sound outlet is connecting at least one of the first and second cavities to the exterior of the apparatus,
   wherein at least one of the first and second cavities and at least one or more of the outlets is configured to limit the sound pressure level at one or more frequencies,
   wherein the third sound outlet is larger than the first and/or second sound outlets,
   wherein the third sound outlet is located on the housing and sized such that the third sound outlet is configured to be blocked, and
   wherein the first and second cavities and at least the second outlet is configured to limit the sound pressure level at the one or more frequencies while the third sound outlet is blocked.

2. An apparatus according to claim 1 wherein the third sound outlet is configured to permit sound in a different direction from the sound outputted at the first and second sound outlets.

3. An apparatus according to claim 1 wherein one or more frequencies is in at least one of a predetermined frequency band, a predetermined frequency response.

4. An apparatus according to claim 1 wherein the apparatus comprises at least one acoustic damper for damping sound from at least one of the first and second sound outlets wherein the at least one acoustic damper is configured to limit the sound pressure level at one or more frequencies.

5. An apparatus according to claim 4 wherein the at least one acoustic damper comprises an acoustic damper at each of the first and second outlets and the acoustic damper at each of the first and second outlets have different compositions such that each damper is configured to limit the sound pressure level at different frequencies.

6. An apparatus according to claim 1 wherein one or more of the outlets comprises at least one of an acoustic damper, a dust mesh, and an acoustic damping mesh.

7. An apparatus according to claim 1 wherein the sound pressure level is below a predetermined threshold value.

8. An apparatus according to claim 1 wherein the first cavity is connected to one side of the transducer and the second cavity is connected to another side of transducer.

9. An apparatus according to claim 1 wherein the first surface of the housing is configured to provide an earpiece function and the second surface of the housing is configured to provide a hands free function.

10. An apparatus according to claim 1 wherein the transducer forms a wall of the first cavity and a wall of the second cavity.

11. A user terminal comprising an apparatus according to claim 1.

12. An apparatus according to claim 1 wherein the volume of the first cavity is larger than the volume of the second cavity.

13. An apparatus according to claim 1 wherein the third sound outlet is blockable by at least one of a cover, a shutter, a slide, any other suitable component of the apparatus, a user finger and other suitable blocking.

14. An apparatus according to claim 1 further comprising:
    a first acoustic damper proximate the first sound outlet;
    a second acoustic damper proximate the second sound outlet; and
    where the third sound outlet comprises either:
       no acoustic damper at the third sound outlet, or
       a third acoustic damper proximate the third sound outlet, where the third acoustic damper has significantly less acoustic dampening compared to the first and second acoustic dampers.

15. An apparatus comprising:
    a transducer configured to generate sound; and
    a housing defining a first cavity and a second cavity, the first cavity and the second cavity being connected to the transducer;
    wherein the first cavity comprises a first sound outlet at a first surface of the housing; and
    the second cavity comprises a second sound outlet at the first surface of the housing and a third sound outlet at a second surface of the housing wherein at least one of the first and second cavities and/or at least one of the first and second sound outlets are configured to limit a sound pressure level of the generated sound at one or more frequencies and the third sound outlet is connecting at least one of the first and second cavities to the exterior of the apparatus,
    wherein the housing defines at least one further cavity adjacent to at least one of the first and second cavities and the at least one further cavity comprises an opening on the first surface of the housing.

16. An apparatus according to claim 15 wherein the at least one of the first and second cavities and the at least one further cavity are connected by one further sound outlet.

17. An apparatus according to claim 16 wherein the apparatus comprises one further acoustic damper for damping sound from the one further sound outlet.

18. A method for producing sound in an apparatus comprising:
    controlling a transducer to produce sound in a first cavity such that sound is directed out of a first sound outlet on a first surface of the apparatus; and
    controlling the transducer to produce sound in a second cavity such that sound is directed out of a second sound outlet on the first surface of the apparatus and sound is directed out of a third sound outlet on a second surface of the apparatus, wherein at least one of the first and second cavities and/or at least one of the first and second sound outlets are configured to limit a sound pressure level of the generated sound at one or more frequencies, and the third sound outlet is connecting at least one of the first and second cavities to the exterior of the apparatus
    where the third sound outlet is larger than the first and/or second sound outlets,
    where the third sound outlet is located on the housing and sized such that the third sound outlet is configured to be blocked, and
    wherein the first and second cavities and at least the second outlet is configured to limit the sound pressure level at the one or more frequencies while the third sound outlet is blocked.

19. An apparatus comprising:
a transducer configured to generate sound; and
a housing defining a first cavity and a second cavity, where the first cavity and the second cavity are connected to the transducer;
wherein the first cavity is coupled to a first sound outlet at a first surface of the housing,
wherein the second cavity is coupled to a second sound outlet at the first surface of the housing and a third sound outlet at a second surface of the housing to limit a sound pressure level at the first surface from the transducer generated sound compared to a sound pressure level at the second surface from the transducer generated sound,
wherein the third sound outlet is connecting at least one of the first and second cavities to the exterior of the apparatus at the second surface,
wherein the third sound outlet at the second surface is larger than the first and/or second sound outlets of the first surface,
wherein the third sound outlet is located at the second surface and sized such that the third sound outlet is configured to be blacked, and
wherein the transducer generated sound at the first surface is limited while the third sound outlet is blocked.

* * * * *

UNITED STATES PATENT AND TRADEMARK OFFICE
CERTIFICATE OF CORRECTION

| | | |
|---|---|---|
| PATENT NO. | : 8,755,553 B2 | Page 1 of 1 |
| APPLICATION NO. | : 13/518732 | |
| DATED | : June 17, 2014 | |
| INVENTOR(S) | : Thomas B. Slotte | |

It is certified that error appears in the above-identified patent and that said Letters Patent is hereby corrected as shown below:

In the Claims

Claim 19, Column 15, line 22, "blacked" should be deleted and --blocked-- should be inserted.

Signed and Sealed this
Ninth Day of September, 2014

Michelle K. Lee
*Deputy Director of the United States Patent and Trademark Office*